United States Patent [19]

Reynolds

[11] 4,380,752
[45] Apr. 19, 1983

[54] AUTOMATIC TRANSMISSION SELECTOR LEVER LOCK

[76] Inventor: Carlton J. Reynolds, R.D. 1, Coal Hill Rd., North Bangor, N.Y. 12966

[21] Appl. No.: 232,453

[22] Filed: Feb. 9, 1981

[51] Int. Cl.³ .............................................. G08B 21/00
[52] U.S. Cl. ............................... 340/52 D; 307/10 R; 70/254
[58] Field of Search ................... 340/52 D; 307/10 R; 70/254, 248, 247

[56] References Cited

U.S. PATENT DOCUMENTS

| | | | |
|---|---|---|---|
| 3,401,544 | 9/1968 | Fraser | 70/248 |
| 3,431,755 | 3/1969 | Eisenman | 70/247 |
| 3,629,818 | 12/1971 | Teruo Hirama et al. | 340/52 D |
| 3,939,939 | 2/1976 | Okazaki | 70/247 |
| 4,235,123 | 11/1980 | Simancik et al. | 70/247 |

Primary Examiner—Glen R. Swann, III
Attorney, Agent, or Firm—Charles S. McGuire

[57] ABSTRACT

An interlock mechanism for mechanically locking a steering column mounted, automatic transmission selector lever in the "park" position by means of a detent locking device which has a first element mounted on the stationary portion of the steering column adjacent a second element on the collar which rotates as the transmission selector lever is moved. The movable detent of one element is spring biased to engage an opening in the other element only when the transmission is in the "park" position. The detent is removed manually or otherwise to allow movement of the transmission out of "park" and may include a signaling device to indicate that the transmission is not in "park" when turning off the ignition, leaving the vehicle, etc.

12 Claims, 3 Drawing Figures

4,380,752

AUTOMATIC TRANSMISSION SELECTOR LEVER LOCK

BACKGROUND OF THE INVENTION

The present invention relates to safety devices for motor vehicles having automatic transmissions and, more specifically, to detent means for mechanically latching the transmission selector lever in the "park" position until intentionally disengaged.

Virtually all modern-day vehicles which are equipped with an automatic transmission include means for locking the wheels against rotation by positive engagement of a member movable by the transmission selector lever, whether or not the motor is running. This is known as the "park" position of the transmission selector lever and is very frequently used by drivers as a substitute for the parking brake. That is, since moving the selector lever to "park" serves to lock the wheels against rotation, many drivers do not bother to apply the parking brake when leaving the vehicle, with or without the motor running. Of course, if the selector lever is moved to place the transmission in a forward or reverse drive position, it is possible that the vehicle may move even though the parking brake has been applied.

The dangers of having a vehicle transmission inadvertently moved out of, or not placed in, the "park" position are readily apparent. The selector lever may be inadvertently, and sometimes unknowingly, bumped by an operator or other individual in the vehicle and moved out of the "park" position after having been intentionally placed therein. Small children left unattended in a vehicle often attempt to move the transmission selector lever, which can be done in any vehicle (in most vehicles only when the engine is running) sometimes resulting in serious accidents. On other occasions an operator may leave a vehicle thinking it has been placed in "park" when in fact it has not, or the selector lever has not fully engaged in the "park" position. Some vehicles, through manufacturing defects or otherwise, have been known to move out of the "park" position after being placed therein without manipulation of the selector lever.

Locking means have been suggested for maintaining the transmission selector lever in the "park" position upon being placed therein until released through the operation of other mechanism. U.S. Pat. Nos. 3,942,614 and 4,096,930, for example, show interlock mechanisms which prevent movement out of "park" and/or neutral positions of the transmission until released by depressing the foot brake. While such mechanisms may be effective for the intended purpose, they are limited to use with rather specialized arrangements of the transmission selector mechanism and require quite extensive mechanical modifications to the vehicle for installation and operation.

It is a principal object of the present invention to provide novel and improved apparatus for locking the transmission selector lever of a motor vehicle in the "park" position, regardless of whether the motor is running or not, which is simple in construction and installation, yet reliable and durable in operation.

A further object is to provide means for releasably latching the transmission selector lever in "park" which is entirely mounted upon the exterior of the steering column.

Another object is to provide means for locking the position of the transmission selector lever in the "park" position upon movement thereto which also provide an audible and/or visual signal in response to a vehicle condition, such as opening a door or turning off the ignition switch, when the transmission is not in "park".

Other objects will in part be obvious and will in part appear hereinafter.

SUMMARY OF THE INVENTION

Many modern motor vehicles are equipped with automatic transmissions having a selector lever extending outwardly to the right of the steering column. The selector lever or associated mechanism is commonly attached to a collar which surrounds the portion of the steering column which is attached to and moved by the steering wheel. Immediately adjacent, either above or below the collar which rotates about the steering column as the transmission selector lever is moved, is a section of the column which remains stationary as both the steering wheel and transmission selector lever are moved. The present invention employs a locking device having a first part mounted upon the aforementioned collar and thus positioned as a function of selector lever position, and a second part mounted adjacent the first on the stationary section of the steering column.

In the disclosed embodiment, an arcuate member conforming to the curvature of the rotatable collar is fixedly attached thereto with a planar surface closely adjacent and parallel to a plane through the juncture of the rotatable collar and stationary section of the steering column. A movable detent member in the form of a sliding latch is mounted upon the stationary section and is spring biased for movement toward the arcuate member. An end portion of the detent rides upon the planar surface of the arcuate member as the collar is rotated by movement of the selector lever. An opening or notch in the planar surface is aligned with the end of the detent when the selector lever is placed in the "park" position. The end of the detent is moved by the spring into the opening, thus locking the collar to the stationary section of the steering column and preventing movement of the selector lever away from the "park" position, whether or not the motor is running, until the detent is removed from engagement with the arcuate member. This is done simply by holding the detent against the spring bias with one hand while moving the selector lever away from "park" with the other. The selector lever may continue to be moved between all other positions until being returned to "park" at which time the locking mechanism will again take effect.

Another aspect of the invention is the provision of means for signaling that the vehicle transmission is not in "park" when the operator leaves the car. Electrically conducting portions of the arcuate element and detent member are in contact and form a closed switch when the selector lever is in other than the "park" position. This switch is wired in series with a second switch which is closed in response to a predetermined vehicular condition, such as the opening of the driver's door or any door of the vehicle. Door switches are conventionally provided on most vehicles to close the circuit to a dome or other lights, to signal that the ignition key has not been removed, etc. Thus, when wired in series with the door switch, the present invention signals the operator that the transmission is not in "park" by sounding an audible and/or activating a visible alarm when the door is opened.

DETAILED DESCRIPTION

Figure 1:
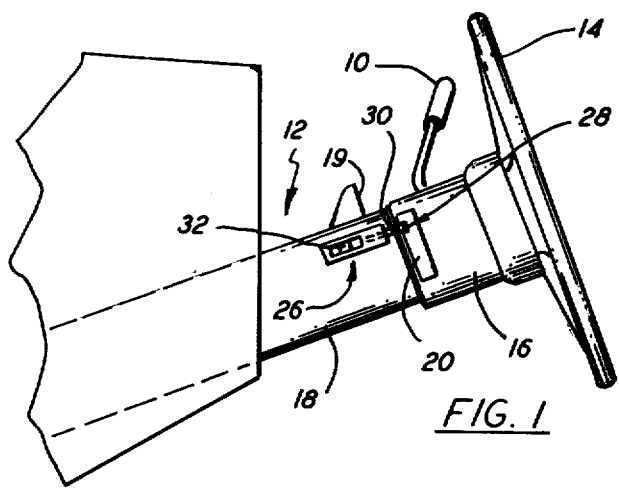
FIG. 1 is an elevational view of portions of a typical motor vehicle whereon the apparatus of the invention is mounted.

Referring now to the drawings, in FIG. 1 are shown certain portions of a conventional motor vehicle equipped with an automatic transmission selector lever 10 extending outwardly from a position in close proximity to steering column 12 to which steering wheel 14 is attached in the usual manner. As is conventional in most modern vehicles of this type, column 12 is surrounded by collar 16 which is attached to selector lever 10 and rotates about column 12 as the lever is moved to place the automatic transmission in its various positions which include neutral, forward and reverse drives, and "park" positions. Whenever the vehicle is left unattended, with or without the engine running, the transmission should be placed in "park" in order to lock the wheels and insure that the vehicle does not unintentionally move in any direction. Column 12 is enclosed over a portion of its length by sleeve 18 which forms a portion of the steering column and remains stationary as both collar 16 and column 12 rotate. Although shown below collar 16 in the drawing, the stationary portion of the steering column to which elements of the locking device of the present invention are attached, as explained later, may be above the rotatable collar in some models of vehicles. Indicator means 19 may be provided on sleeve 18 or elsewhere to show the present position of the transmission.

Figure 2:
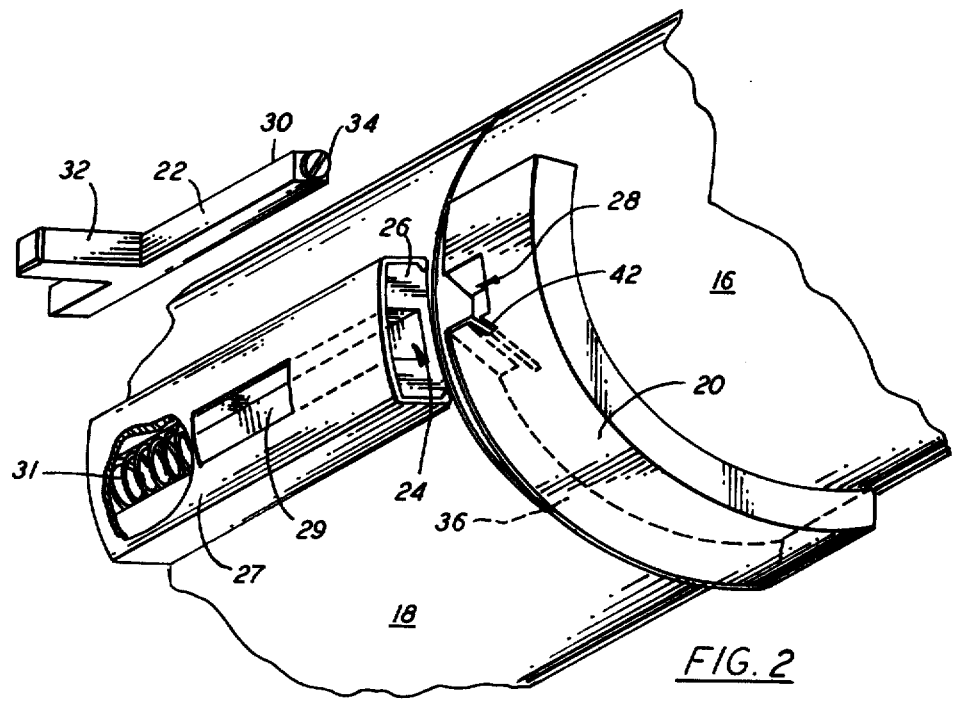
FIG. 2 is a perspective view of the apparatus of the invention and portions of the motor vehicle on which it is mounted.

The apparatus of the present invention includes a first element 20, having an arcuate shape conforming to the curvature of collar 16 and fixedly attached thereto, and a movable detent member 22. The latter is mounted for sliding movement in a slot or groove 24 in support member 26 which is firmly affixed to stationary sleeve 18. Detent member 22 is shown in FIG. 2, for greater clarity, separate from support member 26 upon which it is normally retained by cover 27, having opening 29 through which an upstanding portion 32 of detent member 22 extends. The detent member is biased by spring 31 toward movement into engagement with element 20, which includes a notch or opening 28 at a position thereon which is aligned with end portion 30 of the detent member when selector lever 10 is positioned to place the transmission in the "park" position. Since detent member 22 is mounted upon immovable sleeve 18, element 20 and collar 16 to which it is attached cannot be moved when end portion 30 is engaged in opening 28.

Thus, when selector lever 10 is moved to place the transmission in "park", detent member 22 is moved by spring 31 to engage end portion 30 in opening 28 and the selector lever cannot be moved to take the transmission out of "park" until detent member 22 is disengaged from element 20. Although disengaging movement of detent member 22 against the bias of spring 31 could be performed with a solenoid or other selectively actuated device, for simplicity it is preferred to move member 22 manually. To this end, detent member 22 is provided with upstanding portion 32 which extends through opening 29 in cover 27. Portion 32 may be pushed by the vehicle operator's left hand to remove end portion 30 from opening 28 while moving selector lever 10 with the right hand to take the transmission out of "park". After a slight amount of movement, detent member 22 may be released and surface 34 thereof will engage surface 36 of element 20.

Figure 3:
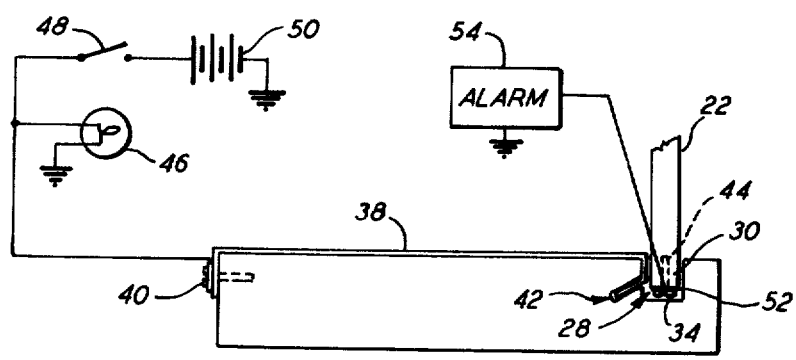
FIG. 3 is a plan view of a portion of the apparatus of FIG. 1 with certain electrical elements shown schematically.

As selector lever 10 is moved to place the transmission in any position other than "park", surface 36 slides upon surface 34 which is biased by spring 31 into engagement therewith. The elements of which surfaces 34 and 36 are made are of electrically conducting material. While it is possible to construct the entire element 20 and detent member 22 of conducting material, it is preferred that separate elements be attached thereto to provide surfaces 34 and 36. As best seen in FIG. 3, metal strip 38 is attached at one end by screw 40 to element 20, and the other end is engaged in slot 42 formed by making a cut in the material of element 20 within opening 28. Metal screw 44 is secured in end portion 30 of detent member 22, the end of the screw providing surface 34. Suitable electrical leads connect strip 38 to the dome light, schematically indicated at 46, with which most vehicles are provided in order to light the interior of the vehicle when a door is opened. Switch 48 connects light 46 to the vehicle battery 50 when the switch is closed by opening a door. Screw 44 is attached either directly or through a suitable electrical connector 52, secured to end portion 30 by the screw, to a buzzer or other such alarm 54 which may be a visible, but is preferably an audible, signaling device. Door-operated switches are, of course, used for actuating devices other than dome lights, including audible alarms for alerting the operator to the fact that the ignition key has not been removed, for example. The switch formed by surfaces 34 and 36 may be wired to such other devices or connected directly to switch 48, if desired. In any event, the elements of the present invention are so designed that they provide both a positive lock for releasably maintaining the transmission selector lever in the "park" position, with or without the engine running, and an alarm device signaling to the operator that the transmission is not in "park" at a time when it should be, such as when the operator opens a door to leave the vehicle.

Although the invention has been disclosed in a simple, yet operative embodiment, it will be understood that a variety of physical constructions are comprehended thereby. For example, detent member 22 may pivot on a post mounted directly upon stationary sleeve 18 rather than sliding in a separate support and guide member. It is equally feasible, of course, to mount the detent member on the movable collar and the element which is engages when in the "park" position upon the stationary sleeve.

The apparatus of the invention is simple and economical in both construction and installation, being equally suitable for installation as original equipment or on existing vehicles. It is also simple in operation, moving automatically to the engaged or locking position upon movement of the selector lever to the "park" position and being quickly and easily disengaged by manual movement which, at the same time, requires manipulation of both the detent member and the selector lever so that inadvertent movement or operation by small children is extremely unlikely, even when children are left unattended in a vehicle with the engine running.

What is claimed is:

1. In a vehicle having an automatic transmission selector lever, movement of which rotates a collar on the steering column adjacent a portion which remains stationary during said movement, an interlock mechanism for mechanically locking said lever in the "park" position until intentionally released, said mechanism comprising:
   (a) an element having a detent-receiving opening therein;
   (b) a movable detent member;
   (c) means biasing said detent member towards movement into said opening when aligned therewith;
   (d) one of said element and detent member being mounted upon said collar and the other upon said stationary portion for relative movement as said collar rotates; and
   (e) said element and detent member being respectively positioned for alignment of said detent member and said opening only when said selector lever is in said "park" position, engagement of said detent member in said opening being effective to prevent rotation of said collar relative to said stationary portion of said steering column and thereby prevent movement of said selector lever until said detent member is removed from said opening against the force of said biasing means.

2. The invention according to claim 1 wherein said biasing means comprises a spring.

3. The invention according to claim 1 wherein said element comprises an arcuate member having a surface adjacent and parallel to a plane through the juncture of said stationary portion and said rotatable column, said opening extending into said surface.

4. The invention according to claim 3 wherein said detent member includes a terminal end portion facing said arcuate member and held by said biasing means in engagement with said surface thereof as said selector lever is moved with the transmission in other than the "park" position.

5. The invention according to claim 4 wherein said arcuate member is mounted upon said rotatable collar and said detent member upon said stationary portion of said steering column.

6. The invention according to claim 1 and further including signal means actuable in response to a predetermined vehicular condition when said detent member is out of said opening.

7. The invention according to claim 6 wherein said signal means is electrically operated in response to simultaneous actuation of two switches, one responsive to said detent means being out of said opening and the other responsive to said predetermined vehicular condition.

8. The invention according to claim 7 wherein said predetermined vehicular condition is the opening of a door.

9. Apparatus for releasably locking a transmission selector lever in the "park" position and for signaling to indicate that the lever is not in the "park" position in response to a predetermined vehicular condition, said apparatus comprising, in combination:
   (a) an electrical power source;
   (b) a first electrical switch which is closed in response to movement of a first vehicle part;
   (c) a locking device having two elements respectively mounted on second and third vehicle parts which are moved relative to one another in response to movement of the transmission selector lever;
   (d) said two elements being constructed and arranged for movement into locking engagement to prevent further relative movement of said second and third vehicle parts, and thereby of said selector lever, upon movement of the latter to the "park" position;
   (e) said two elements having electrically conducting portions which remain in contact when said selector lever is in other than the "park" position and which are removed from contact when said lever is placed in the "park" position;
   (f) said electrically conducting portions forming a second electrical switch wired in series with said first switch; and
   (g) an electrically actuated signaling device connected to said first and second switches and to said power source for actuation only when both of said switches are closed.

10. The invention according to claim 9 wherein said signaling device provides an audible signal when actuated by simultaneous closure of said first and second switches.

11. The invention according to claim 9 wherein said first vehicle part is a door and said first switch is closed in response to opening movement of said door.

12. The invention according to claim 9, 10, or 11 wherein said second and third vehicle parts are, respectively, a collar which is rotated about the steering column as the transmission selector lever is moved and a stationary sleeve portion of the steering column adjacent said collar.

* * * * *